INVENTOR.
LANDON R. GRAY
BY
ATTORNEYS

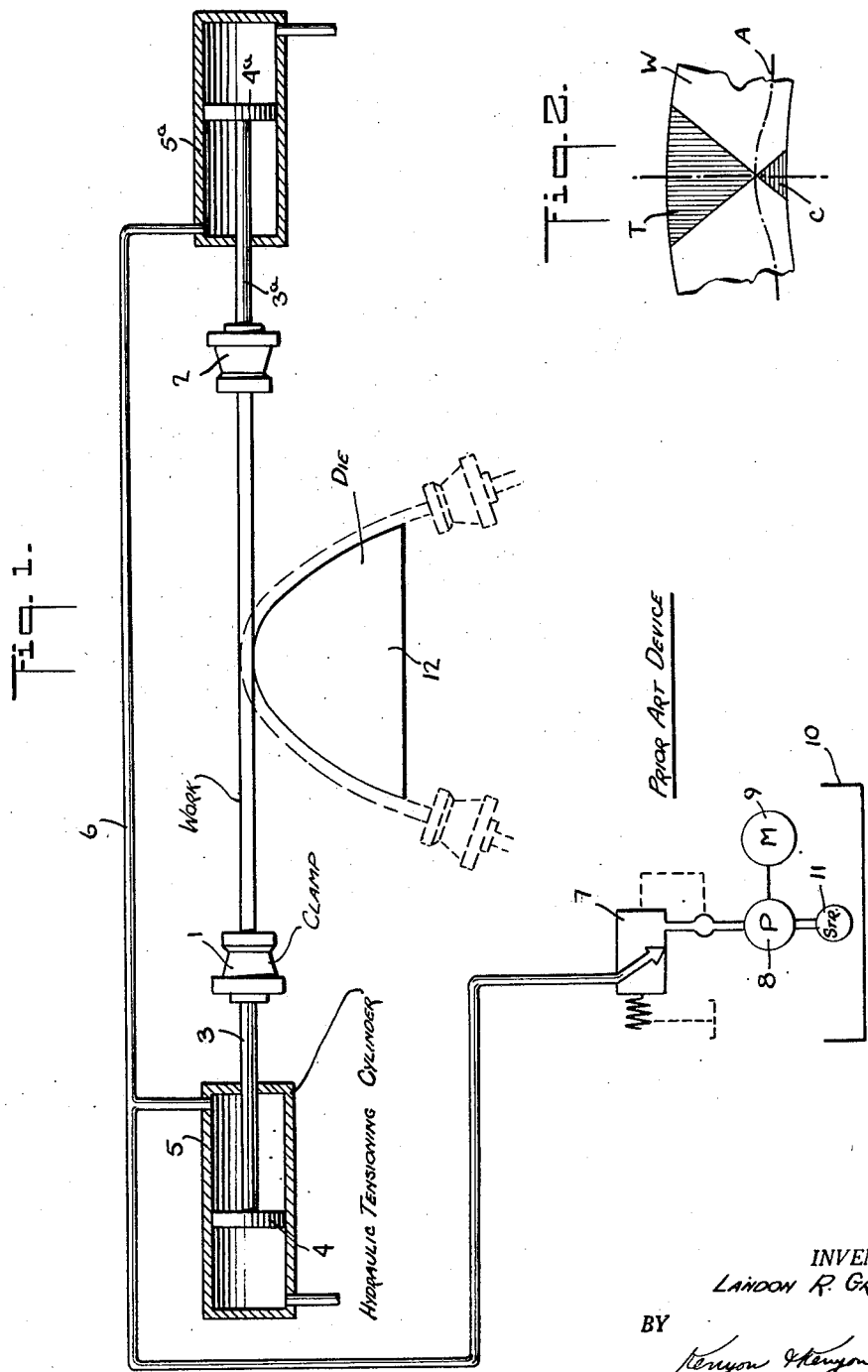

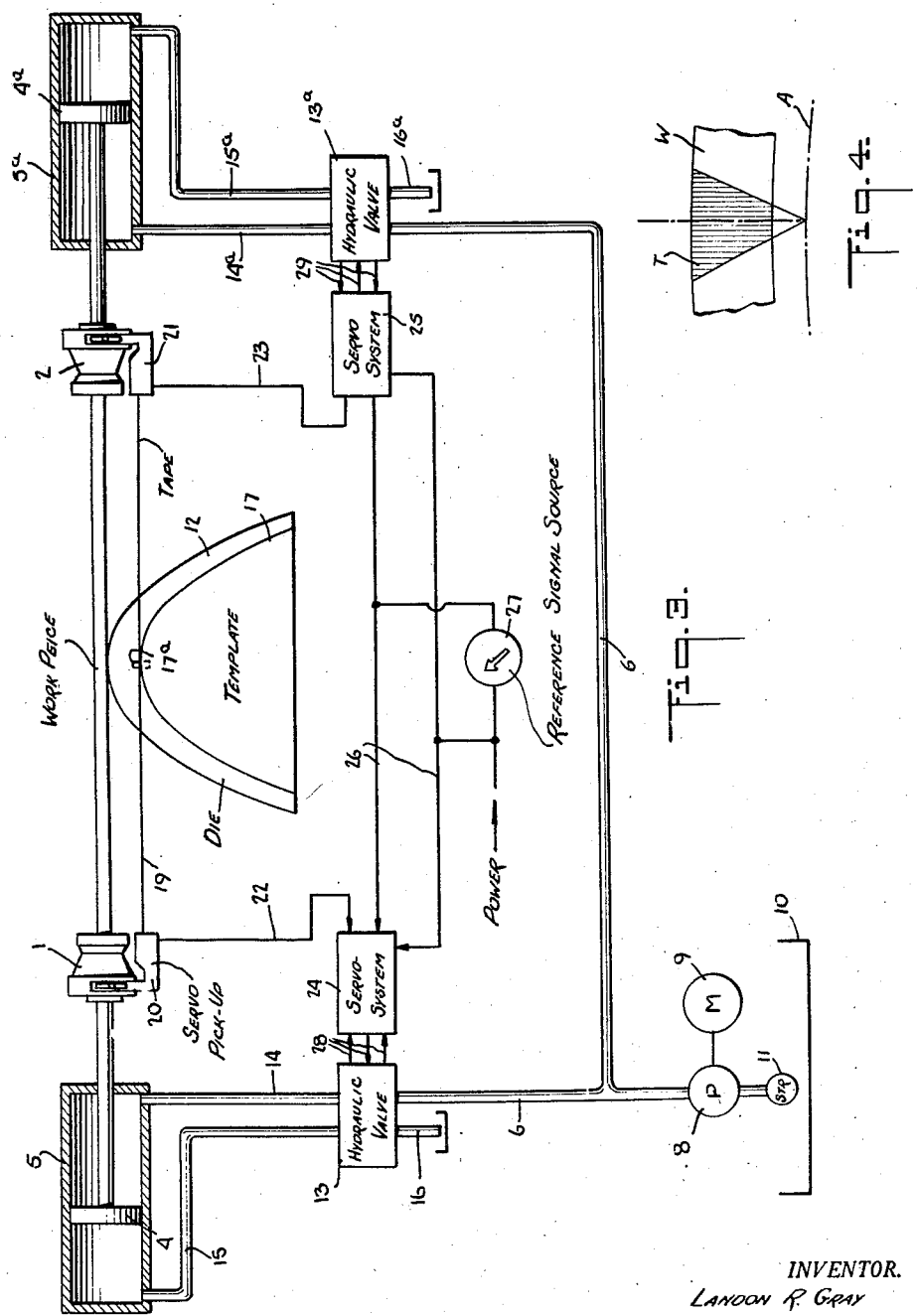

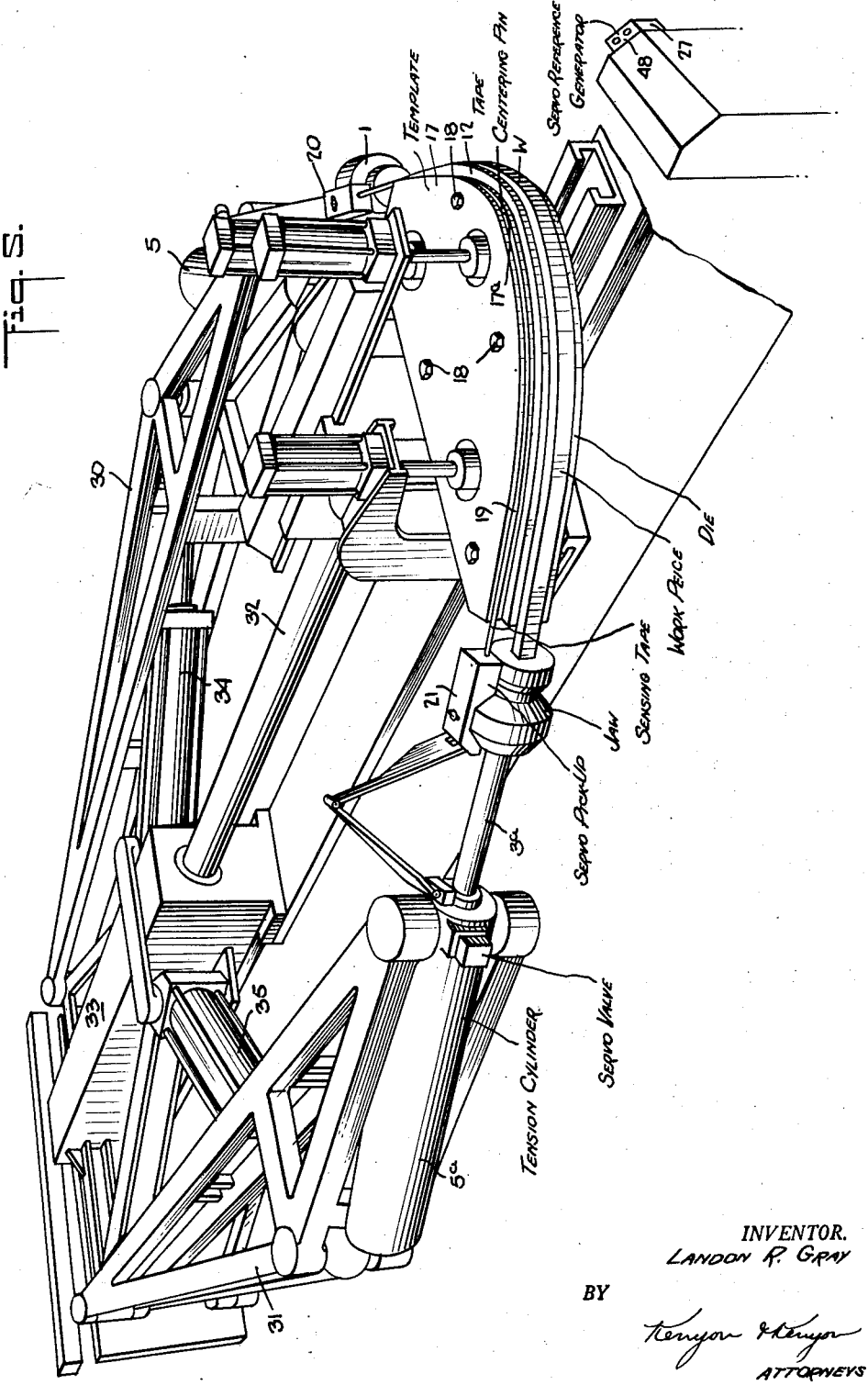

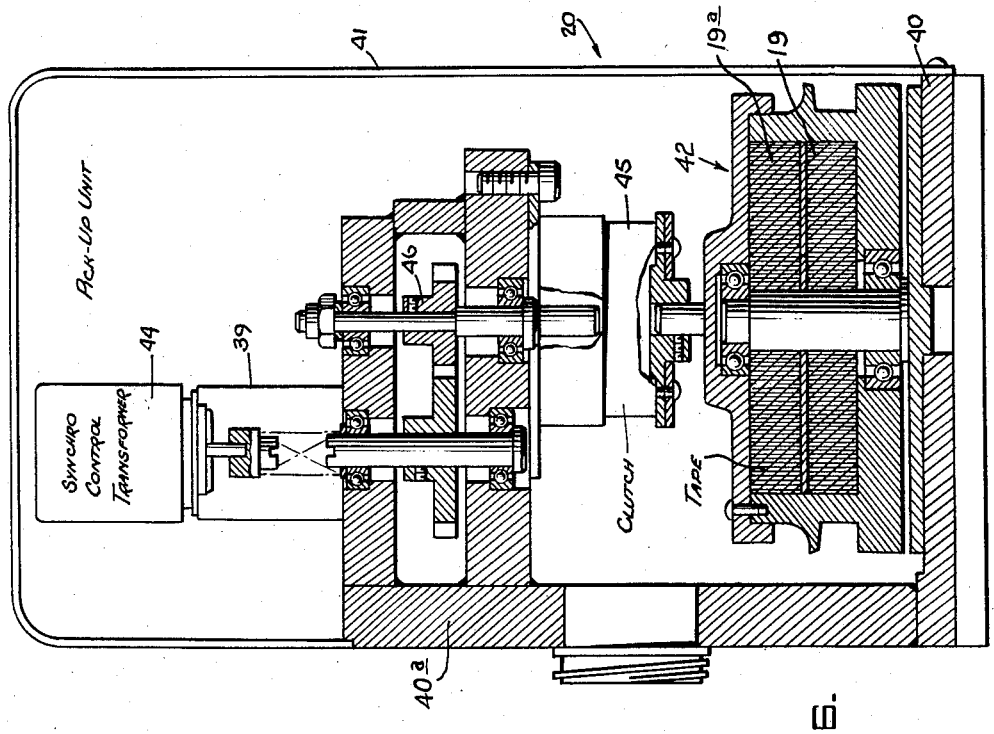
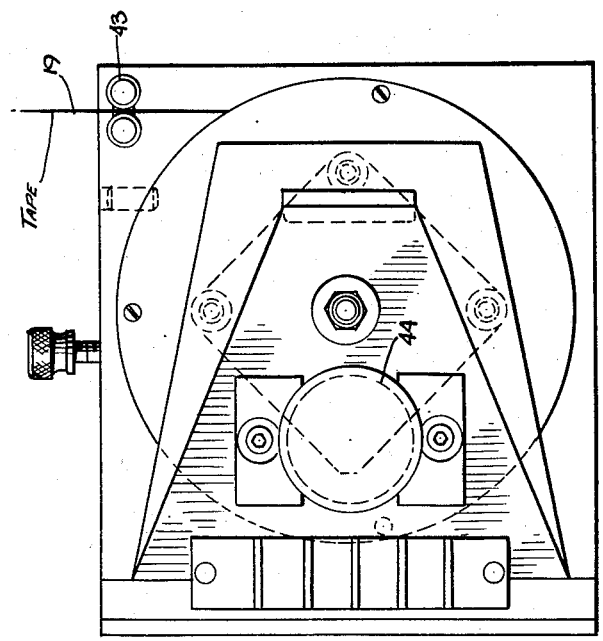

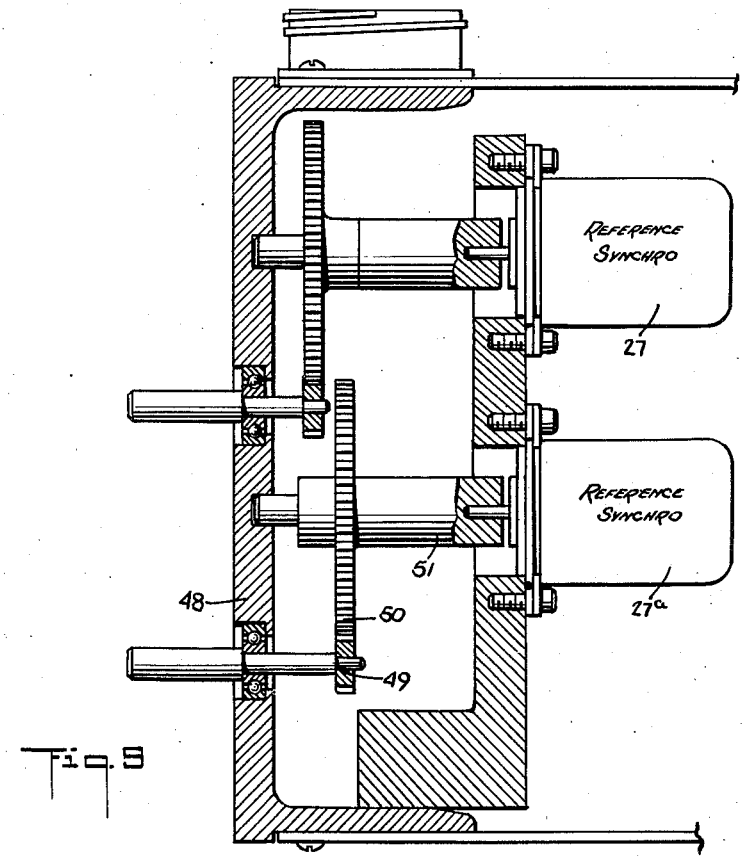

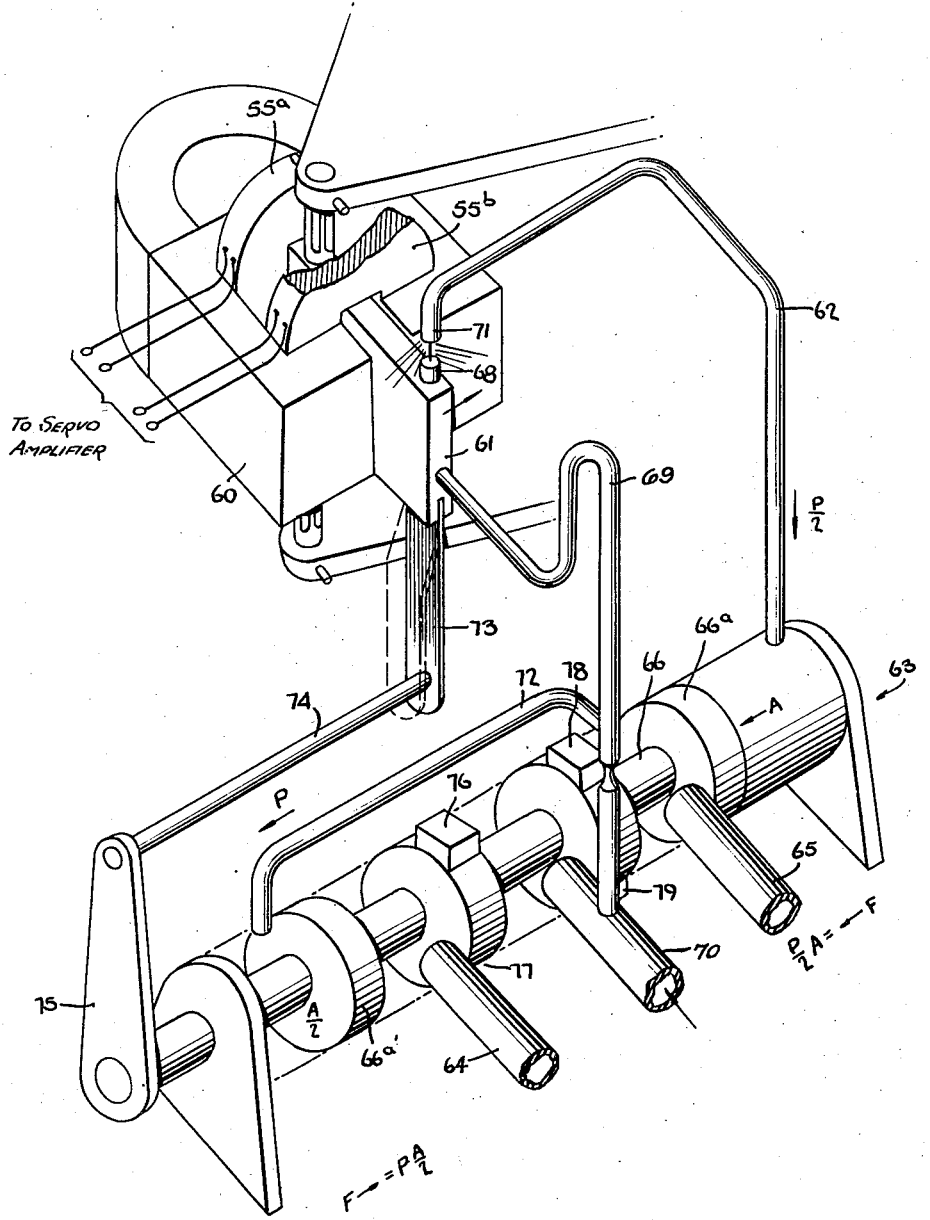

United States Patent Office 2,824,594
Patented Feb. 25, 1958

2,824,594

STRETCH-FORMING MACHINE HAVING A TEMPLATE FIXED TO THE DIE AND A STRETCH CONTROL TAPE EXTENDING FROM A WORK CLAMP TO THE TEMPLATE

Landon R. Gray, Palos Verdes Estates, Calif., assignor to T. W. & C. B. Sheridan Co., New York, N. Y., a corporation of New York Application February 21, 1957, Serial No. 641,504

10 Claims. (Cl. 153—48)

This invention relates generally to stretch-forming techniques and more particularly to an apparatus and process for positive-position forming of metal work. This application is a continuation in part of the pending application Serial No. 482,558, filed January 18, 1955, and later abandoned.

Stretch-forming is a technique which exploits a basic characteristic common to all metals, namely, the elastic ability of the metal to return to its original size and shape after being subjected to limited deformation. When a metal strip is tensioned, a stretch occurs and as long as the elastic limit is not exceeded, the degree of stretch is proportional to the applied pressure. But if this elastic limit is exceeded, which condition is indicated by the fact that the degree of stretch is no longer proportional to the tonnage applied, then the strip will not return to its orginal dimension and shape when the pressure is relieved. On the contrary, the strip will remain deformed.

Existing stretch-forming techniques are made possible by the ability of the metal being formed to resist the pull imposed by a hydraulic cylinder. Varying the amount of hydraulic cylinder pull produces varying amounts of elongation in the part being formed. This phenomena gives rise to two opposing forces, namely, the force exerted by the cylinder and the counteracting force residing in the ability of the material being formed to resist breakage.

Stretch-forming machines include a form die and opposed clamps which engage the extremities of the work, these parts being mounted so that the die and the clamps are movable relative to each other in such a fashion as to permit the work between the clamps to be bent or wrapped around the die. The clamps are also arranged to move relative to each other and are provided with tensioning means for the purpose of tensioning or stretching the work while it is being bent around the forming die.

Usually the above-mentioned tensioning means comprise a hydraulic cylinder containing a double-acting piston, which piston connects with one of the work clamps. It is customary to provide each clamp with a tensioning assembly of this type, although this may not be so in the case of specialized machines. The tensioning cylinder is coupled to a source of hydraulic pressure through suitable valves so that the clamps may be moved together to engage the work and then moved apart to tension the work while it is being bent around the die. The work-tensioning piston and cylinder assemblies can, of course, exert sufficient tension to rupture the work being bent around the die. It is evident, therefore, that the stretch-forming operation must be carefully controlled for the purpose of shaping the work without breaking the work by tensioning it excessively.

The prior art method of controlling the tension on the work being bent is to regulate the pressure of the hydraulic fluid acting on the tensioning pistons in the direction pulling the clamps apart so as to stretch the work. For example, one common arrangement is to use an adjustable pressure relief valve in the hydraulic line leading to the front end of each tensioning cylinder, the valve being adjusted for the purpose of providing a predetermined tension on the work. This practice is based on the principle that if any given piece of work is loaded with tension having a value known to be less than the tensile breaking strength of the piece of work being formed, it should be impossible to break the piece while it is being bent around the die.

Nevertheless, in actual stretch-forming operations the work is sometimes broken while being bent around the die even through the applied tension is controlled in the manner described above. In the case of certain alloys, breakages sometimes reach an alarming figure, this sometimes being so, for example, in the case of titanium and its alloys used by the aircraft industry and shaped on stretch-forming machines.

Experience has shown that it is a practical impossibility to predict the actual tension applied to the work being stretch-formed by a stretch-forming machine. Pressure relief valves do not operate accurately at all times, the friction between the pistons and the cylinders of the tensioning assemblies varies from time to time, and the friction between the work and the die is unpredictable. The total pull exerted by the piston of the tensioning cylinder is equal to the area thereof multiplied by the oil pressure, whereas the opposing force of the work material is determined by its cross-sectional area and its physical properties. The amount of elongation in the part being formed depends, of course, on the force exerted by the tension cylinder. Taking into account the variables present not only in this force by reason of variations in oil pressure but also in the opposing force of the material by reason of dimension tolerances, it is virtually impossible with known machines consistently to maintain the desired amount of elongation throughout the stretch-forming operation or in any group of parts produced thereby. Consequently, in practice, frequent breakages occur when using machines of existing design.

Furthermore, as the work is stretch-formed it receives cold-work strain which increases its yield point, this action occurring continuously and progressively. As a result, the work is caused to function like a bending beam having a neutral axis with stress existing as tension on the convex side of this axis and as compression on the concave side of the axis. After the work receives enough cold-work strain to have its yield point increased so as to balance the applied tension, which is usually slightly higher in value than the initial yield strength of the work, the work ceases to stretch-form and simply bends. The operator then naturally tends to use increasing amounts of tension, this resulting in work breakage. Also to be considered is the fact that the forming die contour is not always smooth and this further aggravates the situation.

Any or all of these factors upset the operator's calculations, the result being that the actual tension applied to the work frequently is unknown as a matter of fact. Sometimes a tension calculated as being correct does not provide proper stretch-forming and when the operator increases the tension work, breakage results.

In view of the foregoing, it is the chief object of the present invention to provide an improved apparatus and process for stretch-forming metal work under such conditions as to reduce the amount of breakages involved by the prior art practice and equipment.

More specifically, it is an object of the invention to provide a positive-position metal part-forming process and apparatus therefor adapted to produce in a consistent manner accurately formed parts.

Briefly stated, these objects are attained in accordance with the invention by providing during the entire forming operations a definite and accurate relationship between the jaws which grip the work-piece to be tensioned and the die on which the material is formed. The arrangement is such that the part being formed cannot be affected adversely in any way, either by the tensioning force or by the resistance of the metal being formed. In an apparatus according to the invention, the part being formed is elongated by positive linear dimensional control in which the gripping jaws follow a predetermined accurate dimensional path with respect to the die during the forming operation regardless of the tonnage being applied to the part, the cross-sectional area or the characteristics of the material being formed. In other words, all variables are taken into account and breakage is avoided.

For a better understanding of the invention, as well as other objects and further features thereof, reference is had to the following detailed description to be read in conjunction with the accompanying drawings, wherein like components in the several views are identified by like reference numerals.

In the drawings:

Fig. 1 schematically shows the prior art stretch-forming practice;

Fig. 2 schematically shows the stress distribution obtained by the prior art;

Fig. 3 schematically shows the apparatus and process of the present invention;

Fig. 4 schematically shows the stress distribution possible when practicing the present invention;

Fig. 5 is a perspective view showing one preferred embodiment of a stretch-forming machine in accordance with the present invention;

Fig. 6 is a sectional view of the servo pick-up unit incorporated in the machine shown in Fig. 5;

Fig. 7 is a top view of the pick-up unit with the cover removed;

Fig. 9 is a sectional view of the servo reference generators for the servo system;

Fig. 12 shows schematically in perspective a preferred embodiment of a torque motor and hydraulic valve assembly.

Figure 8:
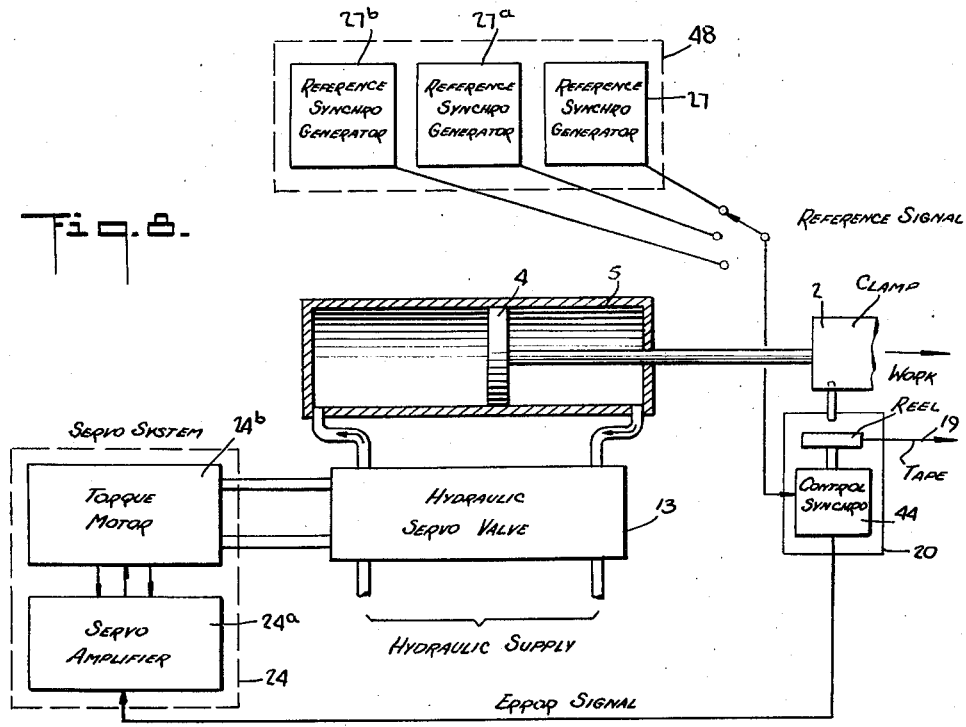
Fig. 8 is a schematic diagram of the servo-loop system of the machine.

Referring now to Fig. 1, which illustrates a prior art arrangement, the work W is shown with its opposite ends engaged by the chuck jaws or work clamps 1 and 2, each of which may be moved relative to the other because it is provided with its own tensioning assembly as previously described. Thus, the clamp 1 is shown mounted on the end of a piston rod 3 extending from a double-acting piston 4 which slides in a cylinder 5. Clamp 2 has a similar arrangement comprising the parts 3a, 4a and 5a. A hydraulic line 6 connects with the forward end of each of the cylinders 5 and 5a and is fed through a pressure relief valve 7 by a hydraulic pump 8 powered by a motor 9. The pump receives the liquid from a tank 10 through a strainer 11, and the valve 7 may be set so as to relieve the pressure in the line 6 whenever it begins to exceed the value for which the valve 7 is set, this valve being of the usual adjustable type.

The die is represented at 12 and this forming die and the clamps 1 and 2 are relatively movable so that the work may be bent around the die, as is indicated by the broken lines. In the operation of the commercial type of machine, the piston and cylinder assembly of each clamp swings with its clamp, this being the usual prior art arrangement. To stretch-form the work, the operator determines the tensile breaking strength of the work W and he then proceeds to set the valve 7 so that the hydraulic pressure applied on the fronts of the pistons 4 and 4a, through the line 6, is less than that tensioning the work beyond this value but which is sufficient, in the operator's opinion, to keep the work stretching beyond its yield point as it is progressively wrapped around the die 12.

For the reasons already mentioned, and perhaps for other reasons, this practice is not always successful. While the operator may believe he is tensioning the work W less than its tensile breaking strength, the work sometimes breaks and with some alloys the number of broken parts may actually exceed the number of parts formed successfully for a given production run. Even though the operator thinks he has set the tension on the work W above its yield point, it is not uncommon to observe considerable spring-back by the work. This indicates that it has been bent simply as a beam and without tension exceeding its yield point which would cause it to flow as it molded itself plastically about the die and in which case there would be but little, if any, spring-back. Increasing the tension under such circumstances frequently leads to consistent breakage.

Fig. 2 is intended to show that when the tension is above the work's yield point and below its tensile breaking strength that at first the work receives cold-work strain which lifts its initial yield point so that the work has the elasticity required to balance the tension. Bending of the work around the die then simply establishes a neutral axis A with the work below this axis in compression, as indicated at C, and with the work above this axis being in tension, as shown at T.

In Fig. 2 the neutral axis A is shown as lacking in uniformity as to direction. The reason for this lack of uniformity is that as the bending progresses the cold-strain hardening of the work may progress unpredictably with a consequent shifting of the axis. It becomes apparent that under the prior art operation conditions and using the prior art control equipment that the stretch-forming of the work involves many unpredictable factors which interfere with successful operation, particularly when working with titanium and its alloys or other metals having a yield point quite close to its breaking strength value.

With the foregoing in mind, we now refer to Fig. 3 where the conventional elements are again shown using the same numerals to identify the corresponding parts. It is to be noted that the pressure relief valve 7 is eliminated. The hydraulic line 6 connects with the tensioning cylinders 5 and 5a for the collet jaws or clamps 1 and 2 through 4-way valves 13 and 13a, there being one of these valves for each cylinder. The valve 13 has one port connecting through a line 14 with the front of the cylinder 5 and another port connecting with the rear of the cylinder 5 through a line 15, the line 6 connecting with the inlet port of the valve 13 and the latter having a fourth port which connects with a line 16 which goes to waste before it returns to the tank 10. The valve 13, as will later be explained in greater detail, is actuated by a torque motor and may be shifted so as to introduce or remove liquid from either end of the cylinder 5 as required to move the piston 4 back and forth or to lock the piston 4 in any given location. The assembly for the clamp 2 has similar parts which are correspondingly numbered in conjunction with the letter a.

Now in this case note that the full pressure of the pump 8 goes to the front and the back of each of the pistons 4 and 4a. Actually, of course, there must be a pressure relief to prevent the pump from working against a closed circuit, but this is afforded by most hydraulic pumps through the construction of the pump itself. Before the pump unloads an extremely high pressure must be attained, and it is this high pressure which is applied to the tensioning cylinders of the stretch-forming machine when practicing the present invention. The available tension is very much greater than the tensile breaking strength of the work to be stretch-formed.

According to the invention, control is effected by providing a reproducible record of predetermined positions of the clamps 1 and 2 relative to each other during predetermined progressive phases of the bending around the die 12. In Fig. 3 this record is provided in the form of a template 17 having a contoured face, which may or may not be similar to that of the die 12, and having means for connecting it to the die with its contoured face adjacent to the working face of the die. This arrangement may be understood by reference to Fig. 5 showing a commercial embodiment of a stretch-forming machine in accordance with the invention wherein the template 17 is connected by stud screws 18 at a slightly spaced location above the die 12, the rounded faces of the die and template being generally parallel to each other.

Further, means are provided for reproducing this record in synchronism with relative movement of the die and clamps bending the work between the clamps around the contoured die face around which the work is bent. In Fig. 3 this means is provided by a flexible non-extensible cable or tape 19 having its opposite end portions movable relative to the clamps 1 and 2, respectively, through servo-transformer pick-up units 20 and 21 whose structure and function will be later described in greater detail. The pick-ups act as sensing devices which respond to any movement of the tape end portions relative to the clamps as the tape 19 is wrapped around the template 17 concurrently with the wrapping at the work about the die. The tape progressively follows the template contour during the forming cycle and transfers the part linear dimensions to the sensing units.

The pick-ups produce signals representative of the movement of the portions of the tape relative to the clamps, which signals are fed through lines 22 and 23, respectively, to an electronic servo-system generally represented by blocks 24 and 25, respectively. A reference quantity, also in the form of an electric signal, is fed to the servo-systems 24 and 25 through lines 26 from an adjustable source 27. As the clamps 1 and 2 bend the work W around the face of the die 12, the tape 19 is simultaneously and synchronously wrapped around the contoured face of the template and the latter, functioning as a record, is, in effect, reproduced by the tape 19 in synchronism with the bending of the work around the die 12.

The servo-systems 24 and 25 include torque motors for actuating valves 13 and 13a, which function as controllable means for causing relative movement of the clamps for stretching the work therebetween. The arrangement is such that the operation is effected automatically and accurately in response to the reproduction of the record by the reproducing means, previously described, so as to cause relative movement of the clamps 1 and 2 to predetermined positions during predetermined progressive phases of the forming of the work and independently of the resistance of the work to such relative movement. The valves 13 and 13a are, of course, servo-valves which cause the pistons 4 and 4a to follow the actuations of the valves; the latter, in turn, are controlled by the servo-systems 24 and 25 which are responsive to the pick-ups 20 and 21. The actual locations of the pick-ups 20 and 21 on the clamps may be viewed in Fig. 5.

The particular stretch-forming machine shown by Fig. 5 has the cylinders 5 and 5a pivotally mounted on swinging arms 30 and 31, while the die 12, to which the template 17 is shown attached, is moved reciprocatively by a piston rod 32 which is operated by a double-acting piston and cylinder arrangement enclosed by the housing 33. The arms 30 and 31 may be swung back and forth by double-acting piston and cylinder arrangements 34 and 35, respectively.

In the operation of the present invention, the die 12 is retracted and the arms 30 and 31 swung apart so that the work W, gripped between the clamps 1 and 2, has the relationship shown by Fig. 3. The template 17 has its face contoured as required to control the positions of the clamps 1 and 2 during the bending so as to stretch-form the work without breaking it and so as to avoid spring-back as much as possible.

Preferably the tape 19 has a localized portion anchored with respect to the face of the template 17. For example, this face may be provided with a pin 17a which passes through a hole formed in the corresponding portion of the tape 19. This tape may be in the form of a flat steel tape, for example. Thus in effect two tape sections are provided, the length of each relative to pin 17a being varied in accordance with the contours of the associated portion of the template as the end portions of the tape sections move relative to the associated clamps.

The operator then operates the press so as to push the die 12 forwardly into the work, the arms 30 and 31 being permitted to swing inwardly, so that the work W bends gradually around the contoured face of the die 12 as this action progresses. Simultaneously the tape 19 wraps around the contoured face of the template 17 and, depending on the contour of this template 17, the clamps 1 and 2 follow a predetermined pattern of positions during the wrapping. With the arrangement shown by Fig. 3 the effect is that of the clamps 1 and 2 gradually moving apart so as to continuously and progressively stretch the work W as it bends around the die 12. This stretching is entirely independent of the resistance of the work W to such stretching. This stretching follows a predetermined pattern, set positively by the template 17, and which is known to properly stretch-form the work without breaking it. Regardless of any cold-strain or work-hardening exhibited by the metal work W, it is continuously stretched during the bending, the stretching force available by the hydraulic pressure, for example, being many times greater than the tension that the work W can withstand without yielding. Depending on the nature of the forming, the clamps 1 and 2 may or may not continue to stretch the work during the forming, it being possible to contour the template 17 so that the stretching halts during certain portions of the bending.

Fig. 4 is similar to Fig. 2 and is correspondingly lettered. However, this figure shows in idealized form the effect obtainable with the present invention. Note that the apparent neutral axis A may be, in effect, shifted until it is entirely free from the work W. The compression C, of Fig. 2, has disappeared, the stress in the work W existing entirely as tension T. This follows from the fact that no effort is made to place a constant tension on the work which is balanced by the work's resistance to this tension. Instead of this prior art practice, the work may, if desired, be stretched continuously very minute increments during the entire bending. The percentage of elongation may be kept very small and yet still represent a continuous elongation, beyond the yield point of the metal work, during the entire stretch-forming operation. The outline of the template of the part being formed is the apparent neutral axis (i. e., the point between tension and compression within the part). The template may be simply a reproduction of the die or tooling template outline and may be easily cut from plywood or similar material.

Having described in general terms the operation of the servo-system as it behaves in conjunction with the stretch-forming machine, we shall now consider in greater detail the elements which form the system and the manner in which these elements are coordinated to carry out their intended functions.

A servo mechanism performs the basic function of keeping a regulated quantity matched to a reference quantity. The principal components of a servo mechanism are an error measurer, an amplifier and an error corrector. The error measurer senses when the regulated quantity is different from the reference quantity and it sends an error signal to the amplifier, which in turn supplies power to the error corrector. In response to the power supplied to it by the amplifier, the error corrector automatically changes the regulated quantity so that it matches the reference quantity.

We shall now consider, with reference to Fig. 6, how the pick-up device 20, which serves as the error measurer in the present invention, acts to produce an error signal. Pick-up device 21 is of identical design and need not be separately treated.

The pick-up device 20 is mounted on a base 40 enclosed by a cover 41. Rotatably mounted on base 40 is a spring-loaded reel 42 on which the end portion of tape 19 is wound. As best seen in Fig. 7, the tape 19 is extended from the reel 42 through guide rolls 43, for wrapping about the contoured surface of the template. The spring 19a in the reel is similar to a coiled clock spring and its purpose is to take up the tape and keep it taut during the action of the control.

The reel 42 is coupled to an electric synchro-control transformer unit 44 through a magnetic clutch 45 and a gear reduction train 46 which are supported on a mounting plate 46a. A flexible coupling 39 is provided between the gear train and the synchro. The magnetic clutch permits disengagement by the tape reel from the synchro unit during setup of the machine and at other times when the servo-control is not required.

The synchro unit 44 is a small alternating-current device used for the transmission of angular positional data. Such devices are usually constituted by a rotatable secondary winding surrounded by three stationary primary windings which are delta connected, the rotor being mounted on a shaft. Synchros are known also as synchronous transformers and by various trade names such as Selsyn and Autosyn. The synchro-control unit is used with a synchro reference transmitter or generator to indicate the displacement between the angular position of the shaft of the generator and that of the control unit, and it produces an error signal which is proportional to the difference in the alignment of the shafts.

When the magnetic clutch 45 is engaged, then any linear movement of the tape 19 in or out will cause rotation of the shaft of the synchro-control unit and a signal will be produced having a magnitude and phase depending on the direction and extent of rotation.

Figure 10:
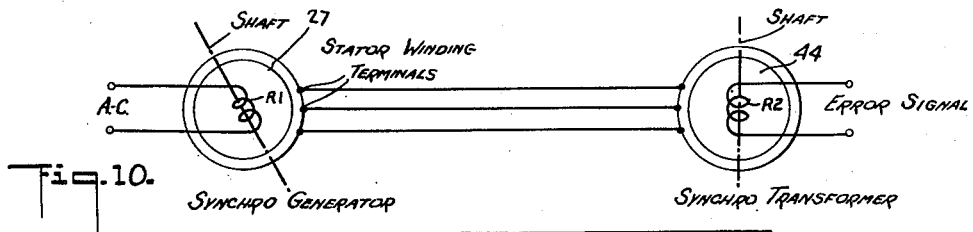
Fig. 10 is a schematic diagram of the synchro arrangement for producing the error voltage.

The manner in which the error signal is produced is shown in Fig. 10 wherein the stator windings of the synchro-control unit 44 are connected to the corresponding stator windings of the synchro-generator 27 acting as the reference source. An alternating voltage is applied to the rotor winding $R_1$ of the synchro-generator 27 and if the rotor winding $R_2$ of the synchro-transformer 44 occupies the same angular position no error signal is produced, but if the rotor angle of the synchro-transformer is displaced from that of the generator, then an error signal will be developed having an amplitude and phase depending on the direction and extent of displacement.

Referring now to Fig. 8, the servo-loop system is shown in block form and it will be seen that the output of the synchro-control unit 44 in the pick-up 20 is fed to a servo-amplifier 24a in the servo-system which acts to amplify the applied error voltage. Servo-amplifier 24a controls a torque motor 24b in a direction determined by the error voltage, the motor 24b acting upon the hydraulic servo-valve 13 to vary the hydraulic tension applied by cylinder 5 so as to cancel the error signal. In other words, the action of the torque motor 24b in response to the error signal produced by the synchro-control unit 44 is such as to change the hydraulic piston position and hence the effective length of the tape 19 in a manner affecting the control unit 20 whereby the error is corrected.

Thus the arrangement shown in Fig. 8 constitutes a feedback loop which makes the system automatic and does away with the need for manual control. It will be evident, then, that once the tape has been withdrawn and attached to template 17 and the magnetic clutches on the pick-up units 20 and 21 have been electrically engaged, any movement of the machine components (die table or clamps) tending to move the end portion of the tape relative to the clamp, thereby changing the length of the tape by extending it or retracting it will be automatically corrected by the servo-system. Since the pick-up units containing the tape reels are attached to the clamps, the clamps are "positive-positioned" in space in a manner dictated by the path followed by the tape in contacting the circumferential contour of the template.

Once the servo-system is in control of the clamp position it is possible to move them toward or away from each other only by changing the angular position of the reference synchro 27 which will command the pick-up synchro transformer unit 44 to correct the difference or error signal thus created. Use is made of this feature in pre-elongating or post-elongating the workpiece by rotating the reference synchro 27 by hand. In a practical embodiment two additional reference synchros 27a and 27b may be provided, and control is switched from one to another by a relay-actuated selector switch 47. Thus one reference synchro may be used for pre-elongation, the next for the stretch-forming operations, and the third for post-elongation, each synchro being properly set to carry out its intended function.

As shown in Fig. 9, the reference synchro generators 27, etc., are fixedly mounted below the control panel 48 of the machine, the angular position of each reference synchro rotor shaft being controlled manually by a spindle projecting through the panel and terminating in a pinion 49 engaging a gear 50 keyed to the shaft coupler 51 of the synchro. A dial may be provided to turn the spindle and the dial may be suitably calibrated in terms of tension values.

Figure 11:
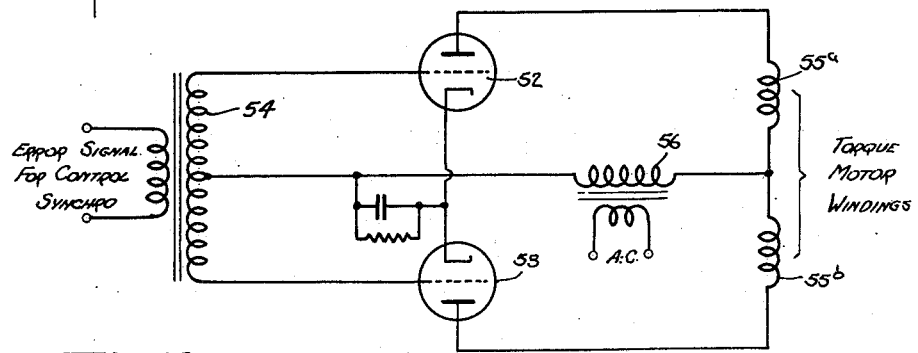
Fig. 11 is a schematic diagram of the servo amplifier.

The manner in which the servo-amplifier 24a acts to control the servo-motor in response to the error signal will be explained in connection with the simplified circuit shown in Fig. 11. The amplifier circuit comprises triode tubes 52 and 53 which are connected in push-pull relationship, the grids of the tubes being connected to the ends of the secondary of an input transformer 54, the anodes being connected to the ends of the serially connected armature windings 55a and 55b of the torque motor 24b. Plate voltage is supplied through a transformer 56 whose primary is connected to the same A.-C. supply which energizes the synchros, the secondary being connected between the center top of the input transformer secondary and the junction of the armature windings 55a and 55b.

The error signal from the synchro-transformer 44 is applied to the grids of tubes 52 and 53 in phase opposition, whereas the plate voltages are in phase coincidence. Because the synchro devices are operated from the same A.-C. line as the servo-amplifier, each grid voltage is either in phase or 180° out of phase with the plate voltages.

Plate currents can flow in tubes 52 and 53 only during the half cycles in which the plate voltages are positive relative to cathode. Therefore, periodic pulses of current are obtained. If the applied error voltage is zero, then the resultant absence of grid voltages gives rise to in-phase anode pulses in tubes 52 and 53. But since the anode currents flow in opposing directions in the armature winding halves, the currents balance out and no field is produced, as a result of which the torque motor is not actuated.

For an error voltage in one direction, the opposing grid voltages will produce a greater anode current flow in one tube than the other, thereby upsetting the balance in the armature winding and producing a motor torque in the direction determined by the error signal. If the error signal is reversed in polarity, the relative current flowing in the tubes will also be reversed, and the motor will turn in the opposite direction. While the motor load has been shown as connected in the anode circuit, it is obvious that the load may be cathode-coupled to the push-pull amplifier.

While the servo mechanism has been shown in conjunction with synchros, it is to be understood that it can also be made to operate with D.-C. as well as A.-C. feedback signals and that in place of synchros, potentiometers and variable reluctance devices may be used to produce the necessary error signals.

Referring now to Fig. 12, there is shown a preferred form of a torque motor and hydraulic valve assembly. The torque motor comprises a permanent magnet field structure 60 within which is rotatably mounted an armature including the windings 55a and 55b connected to the output of the servo-amplifier (note Fig. 11). The torque motor produces a force proportional to the differential current supplied by the servo-amplifier and acts to displace an armature bar 61 movable in the air gap between the pole faces of the field magnet. The torque motor acts upon a hydraulic amplifier to produce a pressure in pipe 62 proportional to the torque motor displacement.

A hydraulic valve, generally designated by numeral 63, is arranged to supply fluid at high pressure to the hydraulic power cylinder 5 (Fig. 8) through outlet tubes 64 and 65 in the direction of flow depending upon which side of center the spool 66 is displaced within the valve cylinder 67, a piston 66a being mounted at the right end of the spool and a piston 66a' being mounted at the left end.

The hydraulic amplifier which controls pressure in pipe 62 includes a projector jet 68 which is mounted vertically on the armature bar 61 of the torque motor and is coupled through flexible pipe 69 to the pressure inlet tube 70 for the hydraulic valve. Positioned above the projector jet 68 and secured to the end of the pipe 62 is a receiver jet 71 which is arranged to half cover the projector jet when the torque motor armature is at the null position, i. e., no error signal is applied. Therefore, the recovery pressure in pipe 62 is one-half the line pressure at pipe 70. Pipe 62 feeds into the valve cylinder at the right end thereof, whereas a line 72 connected to inlet pipe 70 feeds fluid into the valve cylinder at the left end thereof. Thus the fluid pressure fed into the right end of the valve cylinder at null condition is $P/2$, where $P$ is the pressure through the inlet pipe 70, and the fluid pressure fed into the left end of the valve cylinder by line 72 is equal to $P$.

On the other hand, the entire surface of the piston 66a is exposed to fluid pressure, whereas only half of piston 66a' is so exposed. Hence the force "F" to the left is determined by the equation $F=P/2 \times A$, whereas $P$ is fluid pressure and $A$ is the piston area, and the force to the right is determined by the equation $F=P \times A/2$. Thus with the torque armature at null, the forces within the valve cylinder balance out and there is no flow from the valve to the hydraulic cylinder.

Other than at null, the servo-valve operates in the following manner. If a differential current is supplied to the torque motor and the armature moves to the right, as indicated by the arrow, this causes pressure in line 62 to rise above the $P/2$ value. The rise in pressure increases the force F acting to the left and the piston moves to the left. This displacement causes a feedback flat spring 73, connected at one end to the armature bar 61 and at the other to a rod 74 attached to a link 75 mounted at one end of spool 66, to flex and thereby produce a force opposite to the force developed by the torque motor.

When the feedback spring produces a force equal to the force developed by the torque motor, the projector jet 68 is pulled back to null and again $P/2$ exists in pipe 62 and the forces in each end of the piston are balanced. The displacement of the servo-valve spool is therefore proportioned to the resultant intensity of the differential current in the torque motor and the direction of displacement depends on the polarity of the current.

When the spool 66 is displaced to the left, oil flows from pressure line 70 into ports and out of line 65 to one end of the hydraulic cylinder. Oil returns from the other end of the hydraulic cylinder into ports 78 and 79 and out of line 64 to drain into the oil supply. Differential current of opposite polarity on the torque motor causes the valve to move to the right and the flow is reversed to the load cylinder.

As pointed out previously, the actuation of the torque motor is by the servo-amplifier in response to an error signal produced in the control synchro 44 (Fig. 8). The error signal causes the servo-valve to operate in a direction causing the hydraulic cylinder to correct the error signal until a zero signal is established.

In summary, therefore, the positive-position forming process and apparatus disclosed herein utilizes a template which positions the chuck jaws or clamps through a repetitive path accurately, stretch-wrap forming the part against the die. Forming is not affected by pressure fluctuations, material inconsistencies or machine operator error. The positive-position forming technique virtually eliminates part breakage, it reduces springback and it permits large tonnage machines to form extremely small cross-sectional parts. Moreover, it provides positive control to assure design engineers that a part is within allowable strength requirements and it obviates the adverse effects of mill tolerance variations.

While there has been shown what is at present considered to be a preferred embodiment of the invention, it is to be understood that many changes and modifications may be made therein without departing from the essential nature of the invention. It is intended, therefore, in the accompanying claims to cover all such changes and modifications as fall within the true spirit of the invention.

What is claimed is:

1. A stretch-forming machine comprising a forming die, work clamping means, means for relatively moving said die and work clamping means for stretch-forming work around said die, a template fixed to said die, a flexible non-extensible element having at least one end portion movable relative to said clamping means and a portion engaging said template whereby said end portion will be moved relative to said clamping means during relative movement of said die and clamping means, means to maintain said element taut during said relative movement, and means controlled by movement of said end portion relative to said clamping means for controlling the moving means for said die and clamping means to prevent over stretching of said work.

2. A stretch-forming machine comprising a forming die, work clamping means, means for relatively moving said die and work clamping means and for stretch-forming work around said die, a template fixed to said die, a flexible non-extensible element having at least one end portion movable relative to said clamping means and a portion engaging said template whereby said end portion will be moved relative to said clamping means during relative movement of said die and clamping means, means to maintain said element taut during said relative movement, and means including a servo pick-up device controlled by movement of said end portion relative to said clamping means to produce a control signal and a servo system responsive to said control signal for controlling the moving means for said die and clamping means to prevent over stretching of said work.

3. A positive-position stretch-forming machine comprising a die, a clamp for engaging work to be stretch-formed about the die, a tensioning assembly for said clamp, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, means to maintain said tape taut during said relative movement, a servo pick-up device fixedly mounted on said clamp and movable therewith, said pick-up device being controlled by movement of said end portion relative to said clamp to produce a control signal as the tape is bent about said template, and servo system means responsive to said control signal and coupled to said tensioning assembly to vary the tension thereof to prevent over-stretching of said work.

4. A positive-position stretch-forming machine comprising a die, a clamp for engaging the work to be stretch-formed about the die, a hydraulic tensioning assembly for said clamp including a hydraulic cylinder, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, means to maintain said tape taut during said relative movement, a servo pick-up transformer fixedly mounted on said clamp and movable therewith, said transformer including a rotor controlled by movement of said end portion relative to said clamp to produce a control signal as the tape is bent about said template, and means including a servo-system responsive to said control signal and coupled to said tensioning assembly to vary the hydraulic tension thereof to prevent over-stretching of said work.

5. A stretch-forming machine comprising a forming die, work clamping means, means for relatively moving said die and work clamping means and for stretch-forming work around said die, a template fixed to said die, a flexible non-extensible tape having at least one end portion movable relative to said clamping means and a portion engaging said template whereby said end portion will be moved relative to said clamping means during relative movement of said die and clamping means, a spring-biased reel mounted on said clamping means, said end portion of said tape being wound on said reel whereby said reel maintains said tape taut during said relative movement, and means including a servo pick-up transformer having a rotor coupled to said reel and controlled by movement of said end portion relative to said clamping means to produce a control signal and a servo system responsive to said signal for controlling the moving means for the die and clamping means to prevent over-stretching of said work.

6. A positive-position stretch-forming machine comprising a die, a clamp for engaging the work to be stretch-formed about the die, a tensioning assembly for said clamp, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, a spring-biased reel mounted on said clamp and having said end portion of said tape wound thereon to maintain said tape taut during said relative movement, a synchro-transformer fixedly mounted on said clamp and movable therewith, said synchro-transformer including a rotor coupled to said reel and controlled by movement of said end portion relative to said clamp to produce a control signal, and means including a servo-system responsive to said control signal and operatively coupled to said tensioning assembly to vary the tension thereof to prevent overstretching of said work.

7. A positive-position stretch-forming machine comprising a die, a clamp for engaging the work to be stretch-formed about the die, a tensioning assembly for said clamp, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, a spring-biased reel mounted on said clamp and having the end portion of said tape wound thereon to maintain said tape taut during said relative movement, a synchro-transformer fixedly mounted on said clamp and movable therewith, said synchro-transformer including a rotor coupled to said reel and controlled by movement of said end portion relative to said clamp, a reference-synchro electrically coupled to said synchro-transformer to supply a reference voltage thereto whereby said synchro-transformer produces an error signal in accordance with said relative movement, and means including a servo-system responsive to said error signal and operatively coupled to said tensioning assembly to vary the tension thereof to prevent over-stretching of said work.

8. A positive-position stretch-forming machine comprising a die, a clamp for engaging the work to be stretch-formed about the die, a tensioning assembly for said clamp, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, a spring-biased reel mounted on said clamp and having the end portion of said tape wound thereon to maintain said tape taut during said relative movement, a synchro-transformer fixedly mounted on said clamp and movable therewith, said synchro transformer including a rotor coupled to said reel and controlled by movement of said end portion relative to said clamp, a main reference-synchro electrically coupled to said synchro transformer to supply a reference voltage thereto whereby said synchro transformer produces an error signal in accordance with said relative movement, means including a servo-system responsive to said error signal and operatively coupled to said tensioning assembly to vary the tension thereof to prevent over-stretching of said work, an additional reference-synchro, and switching means to couple said additional reference-synchro to said synchro transformer in place of said main reference-synchro to supply a second reference voltage thereto having a value effecting pre-elongation of said work.

9. A positive-position stretch-forming machine comprising a die, a clamp for engaging the work to be stretch-formed about the die, a tensioning assembly for said clamp, means for mounting said die and said clamp and its assembly for relative movement so as to stretch-form work gripped by said clamp around the die, a template fixed to said die and movable therewith, said template having a contoured surface representing a reproducible record of predetermined positions of said clamp during progressive phases of said forming, a flexible non-extensible tape adapted to bend around said template and having at least one end portion movable relative to said clamp and a portion engaging said template whereby said end portion will be moved relative to said clamp during relative movement of said die and clamp, a spring-biased reel mounted on said clamp and having the end portion of said tape wound thereon to maintain said tape taut during said relative movement, a synchro-transformer fixedly mounted on said clamp and movable therewith, said synchro transformer including a rotor coupled to said reel and controlled by movement of said end portion relative to said clamp, a main reference-synchro electrically coupled to said synchro transformer to supply a reference voltage thereto whereby said synchro-transformer produces an error signal in accordance with said relative movement, means including a servo-system responsive to said error signal and operatively coupled to said tensioning assembly to vary the tension thereof to prevent over-stretching of said work, two additional reference synchros, and selective switching means to couple said reference synchros to said synchro-transformer in place of said main synchro to supply second and third reference voltages thereto effecting pre-elongation and post-elongation of said work as well as said predetermined forming thereof.

10. A positive-position stretch-forming machine comprising a die, a pair of clamps for engaging opposing ends of the work to be stretch-formed about the die, a tensioning assembly for each of said clamps, means for mounting said die and said clamps and their assemblies for relative movement so as to streach-form work gripped by said clamps around the die, a template fixed to said die and movable therewith, said template having a contoured surface representing a reproducible record of predetermined positions of said clamps during progressive phases of said forming, a pair of flexible non-extensible tape sections adapted to bend around opposing halves of said template, each section having at least one end portion movable relative to a respective clamp and a portion engaging said template whereby said end portion will be moved relative to the associated clamp during relative movement of said die and its associated clamp, a spring-biased reel mounted on each of said clamps and having the end portion of the associated tape section would thereon to maintain same taut during said relative movement, a synchro-transformer fixedly mounted on each of said clamps and movable therewith, said synchro-transformer including a rotor coupled to the related reel and controlled by movement of the end portion of the related tape section relative to its clamp to produce a control signal, and means including a pair of servo-systems responsive to the respective control signals from said synchro-transformers and coupled to said tensioning assemblies to vary the tension thereof to prevent over-stretching of said work.

References Cited in the file of this patent
UNITED STATES PATENTS

| | | |
|---|---|---|
| 301,106 | Follett | July 1, 1884 |
| 1,679,362 | Knowlton | Aug. 7, 1928 |
| 2,347,575 | Neverdal | Apr. 25, 1944 |
| 2,412,731 | Hoffman | Dec. 17, 1946 |
| 2,426,390 | De Forest | Aug. 26, 1947 |
| 2,439,094 | Miles | Apr. 6, 1948 |
| 2,595,190 | Edwards | Apr. 29, 1952 |
| 2,615,490 | Marcy | Oct. 28, 1952 |
| 2,676,638 | Wheeler | Apr. 27, 1954 |

FOREIGN PATENTS

| | | |
|---|---|---|
| 482,769 | Great Britain | Apr. 5, 1938 |
| 581,095 | Great Britain | Oct. 1, 1946 |